(12) United States Patent
Leonhard et al.

(10) Patent No.: US 10,824,195 B2
(45) Date of Patent: Nov. 3, 2020

(54) GLASS TOUCH SCREEN PROTECTOR

(71) Applicant: AEVOE CORP, San Francisco, CA (US)

(72) Inventors: Michael Leonhard, Santa Clara, CA (US); Jonathan Lin, Mountain View, CA (US); Steven Huang, Taipei (TW)

(73) Assignee: AEVOE CORP., San Francisco, CA (US)

( * ) Notice: Subject to any disclaimer, the term of this patent is extended or adjusted under 35 U.S.C. 154(b) by 450 days.

(21) Appl. No.: 14/272,329

(22) Filed: May 7, 2014

(65) Prior Publication Data
US 2015/0323961 A1    Nov. 12, 2015

(51) Int. Cl.
*G06F 1/16*        (2006.01)
*G06F 3/041*       (2006.01)
(Continued)

(52) U.S. Cl.
CPC .......... *G06F 1/1637* (2013.01); *G06F 1/1626* (2013.01); *G06F 3/0412* (2013.01);
(Continued)

(58) Field of Classification Search
CPC .......... Y10T 428/24322; B32B 17/064; B32B 27/36; B32B 3/02; B32B 7/12;
(Continued)

(56) References Cited

U.S. PATENT DOCUMENTS

| 8,044,942 B1 * | 10/2011 | Leonhard ............ G06F 1/1637 345/173 |
| 2007/0279853 A1 * | 12/2007 | Hung et al. .................. 361/683 |

(Continued)

FOREIGN PATENT DOCUMENTS

| KR | 1020110013813 | * 10/2011 | ............ B32B 27/06 |
| KR | 1020120054088 | * 8/2012 | ............ B32B 17/10 |

OTHER PUBLICATIONS

English Machine Translation from Kipris of KR10-20110013813, Oct. 2011.*

(Continued)

*Primary Examiner* — Frank J Vineis
*Assistant Examiner* — Laura B Figg
(74) *Attorney, Agent, or Firm* — Winston Hsu

(57) ABSTRACT

A glass touch screen protector for a portable electronic device having a front face including a touch screen portion and an outer perimeter. The touch screen protector can include a glass sheet having front and back sides, an outer perimeter that corresponds to that of the device, and a transparent window portion; and a spacer provided along the outer perimeter of the glass sheet surrounding the transparent window portion, having a thickness sufficient to space the glass sheet near but not in contact with the touch screen portion, and an exposed adhesive for removably mounting the protector upon the outer perimeter of the front face to form an enclosed air space between the transparent window portion of the plastic film, the spacer and the touch screen portion of the device. The glass sheet can be convex in shape with respect to the touch screen portion of the portable electronic device.

21 Claims, 3 Drawing Sheets

(51) Int. Cl.
*H04B 1/3888* (2015.01)
*G06F 3/044* (2006.01)

(52) U.S. Cl.
CPC ........ *H04B 1/3888* (2013.01); *C09J 2201/28* (2013.01); *G06F 3/044* (2013.01); *G06F 2200/1634* (2013.01); *Y10T 428/24331* (2015.01); *Y10T 428/24628* (2015.01)

(58) Field of Classification Search
CPC ............. B32B 2457/208; G06F 1/1637; G06F 1/1656; G06F 2200/1634; H05K 5/03; H04M 1/0266; H04M 1/18
See application file for complete search history.

(56) References Cited

U.S. PATENT DOCUMENTS

2012/0183713 A1* 7/2012 Leonhard et al. ........... 428/41.7
2013/0316112 A1 11/2013 Leonhard et al.
2013/0316133 A1* 11/2013 Kim .............................. 428/137
2014/0049496 A1 2/2014 Szalkowski

OTHER PUBLICATIONS

European Search Report; European Application No. 15166530.4; dated Sep. 23, 2015.
Tempered Glass Screen Protector Rainbow Effect (Newton Rings) Fixed; XDA Developers forum; Retrieved from the Internet: URL: http://forum.xda-developers.com/nexus-4/accessories/tempered-glass-screen-protector-rainbow-t2447741;Sep. 17, 2013.
"Nexus 4—Wikipedia, the free 1 encyclopedia"; May 3, 2014, XP055211312; Retrieved from the Internet: URL: https://web.archive.org/web/20140503145233/http://en.wikipedia.org/wiki/Nexus_4.

* cited by examiner

GLASS TOUCH SCREEN PROTECTOR

FIELD

The present disclosure relates to a glass touch screen protector. In particular, the disclosure relates to a glass touch screen protector having a convex transparent window portion with the glass touch screen protector being adapted to be repeatedly removed and attached from a portable electronic device that includes and is operable by a touch screen.

BACKGROUND

With the ever increasing popularity of the touch screen portable electronic devices, a demand for effective touch screen protectors has developed. While the look of glossy screens of touch screen portable electronic devices, such as iPad devices, may be visually appealing, in actual use, the amount of fingerprints left behind can reduce the visual appeal and/or the display quality of the screen. For this reason, the device is often sold with a screen cleaning cloth. As frequent cleaning is not desirable, various screen protecting devices have been suggested.

Several kinds of touch screen protector are currently available. For example, many touch screen protectors employ polyethylene terephthalate (PET) or some type of transparent plastic to guard and protect the display screen. Additionally, many commercial touch screen protectors have a tendency to trap air bubbles and dust, despite careful application. When in use, the touch screen protectors are in direct physical contact with the touch screen of the electronic device, either by static or application of adhesives. Additionally, when the screen protectors are removed, diligent cleaning may be needed to restore the touch screen to its original luster.

BRIEF DESCRIPTION OF THE DRAWINGS

Implementations of the present application will now be described, by way of example only, with reference to the attached figures, wherein.

DETAILED DESCRIPTION

Figure 1:
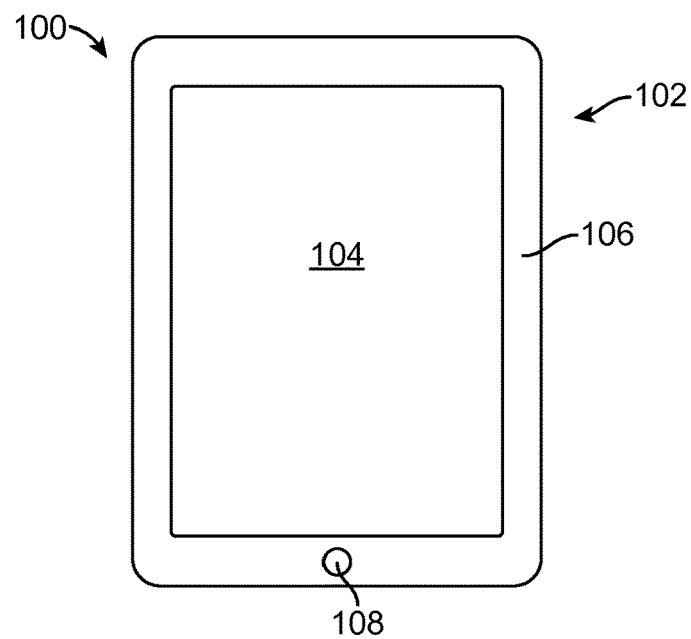
FIG. 1 is a top view of a glass touch screen protector in accordance with an exemplary embodiment.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, the embodiments described herein can be practiced without these specific details. In other instances, methods, procedures and components have not been described in detail so as not to obscure the related relevant function being described. Also, the description is not to be considered as limiting the scope of the implementations described herein. It will be understood that descriptions and characterizations of embodiments set forth in this disclosure are not to be considered as mutually exclusive, unless otherwise noted.

The following definitions are used in this disclosure: The term "near" as used herein means close in distance but not in physical contact, preferably about or less than 1 mm apart. The term "periphery" as used herein means the outermost part or region within a precise boundary. The term "touch screen portion" as used herein means the functional portion of the touch screen of the portable electronic device. The term "nonfunctional band around the perimeter" as used herein means the area surrounding the touch screen portion of the portable electronic device which can be made of a different material or made of the same material as the touch screen but is not touch sensitive. Generally, the term "touch screen" as used herein means a single glass sheet that includes the operable touch screen portion and the nonfunctional band around the perimeter of the touch screen portion. The term "anti-static" is used to mean that the glass sheet does not generate static electricity when contacted or rubbed by the user.

A glass touch screen protector can be used to protect touch screens of many different kinds of portable electronic devices, such as a mobile telephone, reading device, music device, viewing devices, navigation device or other portable electronic devices. Examples of such devices are iPhone, Nook, iPod, iPad, Droid, and GPS navigation systems. The nature of the glass touch screen protector and its design enable specific embodiments to be adapted to conform to the touch screen of any such portable electronic device. For example, the shape of the glass touch screen protector can have corners that are rounded or beveled to match those of the portable electronic devices.

Referring to FIG. 1, a top view of a glass touch screen protector in accordance with an exemplary embodiment is illustrated. As shown, the glass touch screen protector 100 can be generally rectangular. However, the shape of the glass touch screen protector 100 is not limited to only generally rectangular shapes. The glass touch screen protector 100 can include a glass sheet 102 and a spacer (shown in FIG. 2). The glass sheet 102 can be shaped and have dimensions that substantially correspond to the shape and dimensions of a top surface of a portable electronic device. The glass sheet 102 can include a transparent window portion 104 and a band 106 surrounding the perimeter of the transparent window portion 104. In some embodiments, the transparent window portion 104 and the band 106 can be a single component. In some embodiments the transparent window portion 104 and the band 106 can be different components. The transparent window portion 104 can substantially correspond to the touch screen portion of the portable electronic device. The light transmission of the transparent window portion 104 can be between about 90%-99%. The band 106 can be opaque or non-opaque. Accordingly, in some embodiments, when the window portion 104 and the band 106 are the same embodiment, the opacity can be provided by a layer of ink or paint on the surface of the band 106. In other embodiments, the band 106 can be tinted glass.

The band 106 can essentially conform to the non-functional band that surrounds the touch screen portion. The band 106 can include one or more holes 108 corresponding to one or more buttons of the portable electronic device. For example, as shown, the band 106 can have a hole 108 that corresponds to the on-off selector button of an iPad. By exposing the buttons for ease of operation, the one or more holes 108 can act as alignment features to facilitate proper mounting of the glass touch screen protector 100 on the portable electronic device.

The glass sheet 102 can be sufficiently hard or stiff to prevent the glass sheet 102 from bending or collapsing under its own weight and/or to avoid the transparent window portion 104 being pressed against the touch screen portion when pressure is applied to the glass sheet 102 during normal use. For example, when pressure is applied to the transparent window portion 104, the transparent window portion 104 may flex but should not contact the touch screen portion when a reasonable amount of pressure is applied to the transparent window portion 104. To accomplish this, the glass sheet 102 can be sufficiently thin and have sufficient elasticity to withstand excessive pressure, for example, excessive pressure to cause the transparent window portion 104 to flex and contact the touch screen portion. Preferably, the hardness of the glass sheet 102 can be between about 7 and about 9, as determined by Mohs scale of hardness values. In some embodiments, the hardness of the transparent window portion 104 can be more or less than about 7 and about 9 on the Mohs scale of hardness values.

The transparent window portion 104 can be made of any suitable transparent material available. Preferably, the transparent window portion 104 is silica based. In some embodiments, the transparent window portion 104 can be soda-lime glass, lead glass, flint glass, sodium borosilicate glass, oxide glass or any other suitable transparent material. In some embodiments, the transparent window portion 104 can be made of Willow Glass™ by Corning Inc. of Corning, N.Y.

The glass sheet 102 and/or the transparent window portion 104 can be compressed to cause the glass to be one or more of strengthened, tempered, and convexed. For example, the glass sheet 102 or the transparent window portion 104 can become convex by applying different amounts of pressure when the glass sheet 102 and/or the transparent window portion 104 is compressed. The glass sheet 102 and/or the transparent window portion 104 can be convex with respect to the touch screen portion of the portable electronic device when the glass touchscreen protector 100 is adhered to the portable electronic device. The thickness of the transparent window portion 104 can be in the range of about 0.1 mm to 0.6 mm. As a result of the glass sheet 102 and/or the transparent window portion 104 being convexed, the glass sheet 102 and/or the transparent window portion 104 can assist in preventing or avoiding the generation of interference fringes (also referred to as Newton Rings, or interference patterns) when the glass touch screen protector 100 has no force being applied and/or when normal pressure is applied to the transparent window portion 104. Unlike most of the prior art touch screen protectors which are in direct physical contact with the touch screen, the glass touch screen protector 100 does not contact the touch screen portion unless excessive force is applied to the transparent window portion 104. As a result, the glass touch screen protector 100 can assist in preventing or avoiding the generation of interference fringes during normal use.

Figure 2:
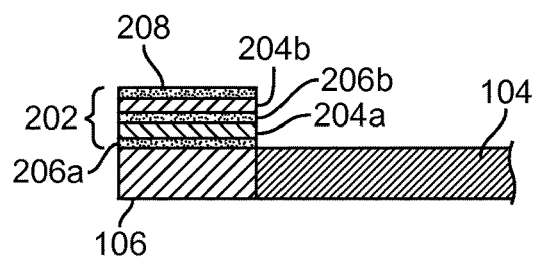
FIG. 2 is an expanded partial sectional view of the glass touch screen protector in accordance with an exemplary embodiment.

Referring to FIG. 2, an expanded partial sectional view of the glass touch screen protector in accordance with an exemplary embodiment is illustrated. As shown, the glass touch screen protector 100 can include a transparent window portion 104, a band 106 and a spacer 202. The spacer 202 can be coupled to the band 106. Preferably, the spacer 202 can substantially correspond in shape to the band 106. In some embodiments, the spacer 202 can be larger or smaller than the band 106. Preferably, the width of the spacer 202 can substantially correspond to the width of the band 106. In some embodiments, the width of the spacer 202 can be larger or smaller than the width of the band 106. When the band 106 is opaque and when the width of the spacer 202 substantially corresponds to the width of the band 106, the spacer 202 can be substantially hidden from a direct top view when the glass touchscreen protector 100 is adhered to a portable electronic device.

In some embodiments, the spacer 202 can comprise an adhesive. In some embodiments, the spacer 202 can comprise one or more strips 204 and adhesives or layers of adhesives 206. For example, a first strip 204A can be adhered to the band 106 by an adhesive or adhesive layer 206A, a second strip 204B can be adhered to the first strip 204A by an adhesive or adhesive layer 206B. An exposed adhesive or exposed adhesive layer 208 can adhered to the second strip 204B. The exposed adhesive or exposed adhesive layer 208 can couple the glass touchscreen protector 100 to a portable electronic device. The strips 204 can be made up of any type of plastic film, including PET, or other resilient substrate. In some embodiments, the spacer 202 can be made up of one or more layers of adhesive 206 while lacking any non-adhesive strips 204. In some embodiments, the spacer 202 can consist solely of one adhesive. In such case, the outer surface of the adhesive is the exposed adhesive 208 for contact with a display screen. Preferably, the exposed adhesive or exposed adhesive layer 208 can have sufficient adhesiveness to mount the glass touchscreen protector 100 to a portable electronic device multiple times for repeated removal and re-attachment, and enables the removal of the glass touch screen protector 100 without leaving adhesive residue on the portable electronic device. Various adhesives of this type are commercially available and a skilled artisan can select the particular adhesive for the specific application of the glass touch screen protector 100 to a portable electronic device. In some embodiments, the adhesive(s) can be silicon based such as a silicone adhesive, or alternatively acrylic, polyurethane (PU) or elastomer based adhesives. More preferably, the adhesive 206 that couples the strips 204 can have stronger adhesiveness than the exposed adhesive 208 which attaches the glass touch screen protector to the portable electronic device because the spacer 202 is not intended to be removed from the glass touch screen protector 100. In embodiments lacking strips 204 and having multiple layers of adhesive, each consecutive layer in the direction of the glass screen protector 100 can have an increasing adhesive strength such that the spacer 202 is not removed from the glass screen protector 100, and the exposed adhesive 208 having the least adhesive strength. In embodiments where the spacer 202 consists only solely of one adhesive layer, the portion contacting the glass screen protector has stronger adhesiveness than the exposed adhesive 208 has to a display screen. By using such an exposed adhesive or adhesive layer 206, the glass touchscreen protector 100 can be removed, cleaned and re-applied to the portable electronic device. Any commercial available washable and reusable adhesive can be used herein. In some embodiments, the spacer 202 can be double sided tape.

Figure 2A:
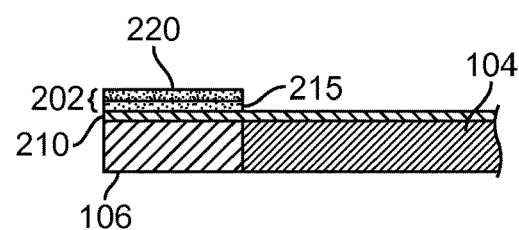
FIG. 2A is an expanded partial sectional view of the glass touch screen protector in accordance with an exemplary embodiment.

An additional example is illustrated in FIG. 2A. In such example, there is shown transparent window portion 104 and band 106. The window 104 and band 106 are overlaid with a shatterproof layer 210. The shatterproof layer 210 aids in preventing the glass sheet 102, which includes window 104 and band 106, from fracturing into small pieces when shattered. The shatterproof layer 210 can be made of PET, for example, or other plastic. The shatterproof layer 210 can be bonded to window 104 by a strong adhesive, for example an acrylic adhesive, for example an optical grade acrylic adhesive. The shatterproof layer can be very thin, for example less than 0.1 mm. The spacer 202 can comprise two layers of adhesive, a stronger adhesive 215, and a weaker adhesive 220. In other examples, the adhesives can be selective for the material they will bond to. For example, the stronger adhesive 215 will bond to the shatterproof layer 210, whereas the weaker adhesive 220 will bond to a display screen, made up of glass for example. The relative adhesive strengths should be such that the spacer 202 maintains bonding to the shatterproof layer 210, i.e., the glass sheet, whereas, weaker adhesive 220 permits easy and repeated bonding and attachment to a display screen of a mobile device. This differential adhesiveness permits the adhesive to stay bonded to the glass or shatterproof layer 210. In some examples, the weaker adhesive can be a silicone adhesive, whereas the stronger adhesive 215 is acrylic. In some examples, the shatterproof layer 210 can be omitted, and the stronger adhesive 215 can bond directly the band 106 portion of glass sheet 102.

Although varying from device to device, the distance between the transparent window portion 104 and the touch screen portion of the portable electronic device can be determined by the thickness of the spacer 202. Preferably, the thickness of the spacer 202 can be less than that of the transparent window portion 104. In some embodiments, the thickness of the spacer 202 is approximately equal to or greater than the thickness of the glass sheet 102. The spacer 202 can have a thickness sufficient to space the transparent window portion 104 near but not in contact with the touch screen portion. The spacing between the touch screen portion and the top of the glass touchscreen protector 100 can be in the range of about 0.01 mm to 1.0 mm with the thickness of the spacer being in the range of about 0.01 mm to 0.2 mm. The spacing can be as small as possible provided that the transparent window portion 104 is not in contact with the touch screen portion when no force is being applied to the transparent window portion 104. The stiffness of the glass sheet 102 can contribute to the desired spacing as the stiffer the glass sheet 102 is, the closer the spacing can be. In contrast, the desired spacing should not be too large to hinder the user's ability to operate the touch screen portion by touching the transparent window portion 104 and inducing a capacitive value onto the touch screen portion. To assure that the operative portions of the touch screen portion are not hindered, the spacer 202 can have a thickness that is less than that of the band 106 wherever possible. The preferred dimensions and properties disclosed herein achieve these features.

For portable electronic devices that have non-functional boundaries that are not uniform, for example, the iPod Touch, the exposed adhesive 208 of the glass touch screen protector 100 can be configured in the same manner. In some embodiments, an adhesive can be applied only upon a portion of the perimeter, such as on top and bottom of a rectangular glass touch screen protector 100 when the side boundaries of the touch screen are very small so that the glass touch screen protector 100 can be mounted on the portable electronic device without blocking or interfering with the functional portions of the touch screen portion.

In some embodiments, the glass touch screen protector 100 can achieve the desired spacing without providing irregularities, bumps or other non-uniformities on a back side of the transparent window portion 104. In some embodiments, the glass sheet 102 and/or the transparent window portion 104 is substantially flat (that is, not convexed). To assist in preventing or avoiding the generation of interference fringes during normal use, micro-particles can be applied to the underside of the glass sheet 102 and/or the transparent window portion 104. The micro-particles can be applied to the underside of a convexed or substantially flat glass sheet 102 and/or the transparent window portion 104. The underside of the glass sheet 102 and/or the transparent window portion 104 is the side that is closest to the portable electronic device when the glass touch screen protector 100 is mounted on a portable electronic device. The micro-particles can be printed on the underside of the glass sheet 102 and/or the transparent window portion 104. The micro-particles are not in physical contact with the touch screen portion unless the glass touch screen protector 100 is pressed against the touch screen portion. The micro-particles can provide an anti-static effect and can quickly bounce back or pull away the glass sheet 102 and/or the transparent window portion 104 from the touch screen portion once it is no longer pressed against it. The micro-particles on the inner side of glass sheet 102 can be of various shapes, such as column shaped and/or wave shaped. The density of the micro-particles can be optimized such that they can be dense enough for providing anti-static effects but not too dense as to adversely affect the quality of images that are viewed through the window. Preferably, a micro-particle covering can be more than 5% of the glass sheet 102 and/or the transparent window portion 104. More preferably, the micro-particles covering can be more than 8% of the glass sheet 102 and/or the transparent window portion 104. Most preferably, the micro-particles covering can be more than 10% of the glass sheet 102 and/or the transparent window portion 104. If desired, the entire glass sheet 102 of the protector can be covered with micro-particles, but good results can also be achieved if up to 50% of the entire glass sheet 102 is covered. The micro-particles can be made of any transparent material commonly known in the art, such as an oleophobic coating. Preferably, the micro-particles are made of PET so that they are compatible with the glass sheet 102. In some embodiments, the glass sheet 102 and/or the transparent window portion 104 of the glass touch screen protector 100 can include micro-particles on both sides so that the outer surface of the glass sheet 102 also does not generate static electricity during use.

Figure 3:
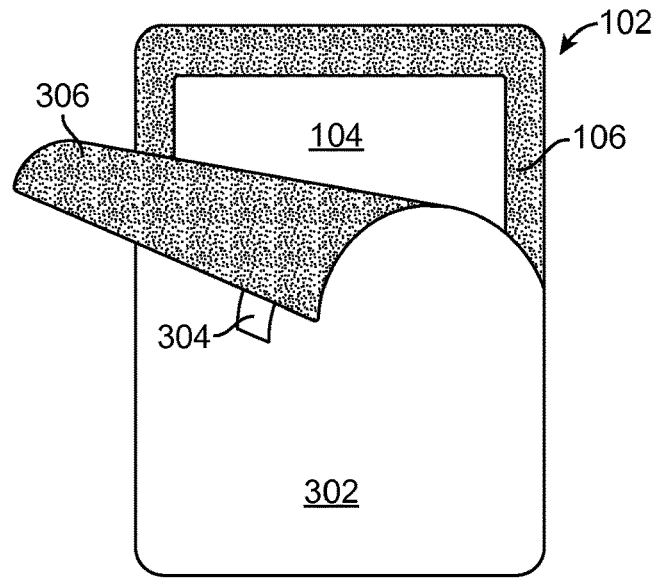
FIG. 3 is a back view of the glass touch screen protector with a portion of the backing member removed in accordance with an exemplary embodiment.

Referring to FIG. 3, a back view of a glass touch screen protector having a backing member in accordance with an exemplary embodiment is illustrated. As shown, the glass touch screen protector 100 can further include a backing member 302 to protect a back side of the touch screen protector 100 and the exposed adhesive 208 of the spacer 202. The back side of the glass touch screen protector 100 is the side that is closest to the portable electronic device when the glass touch screen protector 100 is adhered to the portable electronic device. The backing member 302 can include a tab 304 to assist in the removal of the backing member 302 prior to mounting the glass touch screen protector 100 onto the portable electronic device. By grasping and pulling on the tab 304, the backing member 302 can be removed completely from the glass touch screen protector 100 thereby exposing the adhesive 208 prior to mounting the glass touch screen protector 100 to the non-functional border of the touch screen portion of the portable electronic device. The backing member 302 can include surface 306 which permits adherence of the backing member 302 to the back side of the glass touch screen protector 100 as well as easy removal, and can optionally have adhesive thereon. There are various adhesives as described herein that are commercially available and a skilled artisan can select the particular adhesive for the specific application of adhering the backing member 302 to the back side of the glass touch screen protector 100. The adhesiveness of any adhesive on surface 306 can be weaker than the exposed adhesive 208 on the spacer 202.

Figure 4:
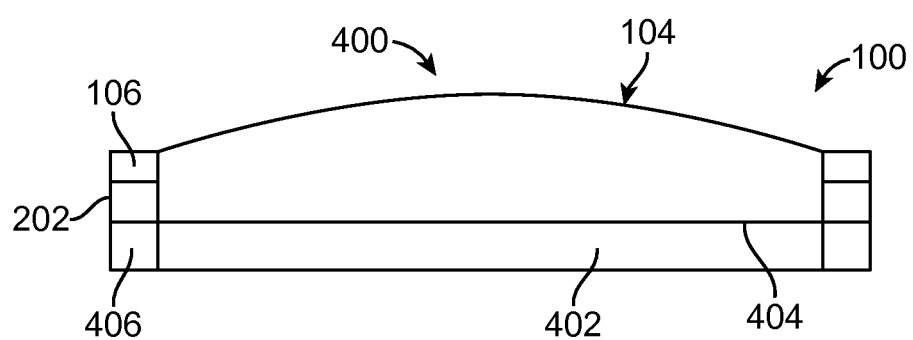
FIG. 4 is an expanded side view of a glass touch screen protector with respect to a portable electronic device in accordance with an exemplary embodiment.

Referring to FIG. 4, a side view of a glass touch screen protector mounted on a portable electronic device in accordance with an exemplary embodiment is illustrated. As shown, the glass touch screen protector 100 is mounted on a portable electronic device 406 with the transparent window portion 104 being convex with respect to the touch screen portion 404 of the portable electronic device 402. In one or more embodiments, the glass sheet 102 can be convexed rather than just the transparent window portion 104. As shown, the glass sheet 102 and/or the transparent window portion 104 can have a peak in the middle of the transparent window portion 104. As a result of the peak in the middle of the transparent window portion 104, the space between the glass sheet 102 and/or the transparent window portion 104 increases from the outer perimeter of the glass sheet 102 and/or the transparent window portion 104 toward a middle are of the glass sheet 102 and/or the transparent window portion 104. As shown, a spacer 202 separates the band 106 from the nonfunctional band 406 around the perimeter of the touch screen portion 404 of the portable electronic device 402. As shown, the glass touchscreen protector 100 forms an enclosed air space between the transparent window 102, the spacer 202 and the touch screen portion 404 of the portable electronic device 402.

The glass touch screen protector 100 can have the advantage of being able to be installed easily and quickly, for example, within 30 seconds or less. Because the installation process can be so quick, when properly applied, little to no dust can be trapped in between the touch screen portion of the portable electronic device and the glass touch screen protector 100. As the glass touch screen protector 100 can be gently applied to the outer perimeter of the touch screen of a portable electronic device, there is little to no concern for leaving glue traces on the touch screen portion. Thus, the glass touch screen protector 100 can be easily and readily removed without any adverse effects on the appearance and display quality of the touch screen portion of the portable electronic device.

Advantageously, when the portable electronic device is protected by the glass touch screen protector 100, there is limited or no fingerprint smudges on the touch screen portion, little to no decrease in the quality of the display, and little to no decrease in the touch response of the touch screen of the portable electronic device. The glass touch screen protector 100 can allow for the use of a capacitive stylus when using applications, such as an art application, on the portable electronic device.

The glass touch screen protector 100 can reduce the glare of a glossy touch screen portion. As a result, displayed photos on the touch screen portion can look like prints. There is virtually little to no effect on the crispness of the touch screen portion even though the glare can be reduced or completely removed. Owing to the finger print resistance feature of the glass touch screen protector 100, the glass touch screen protector 100 can reduce the issue of smudging on the touch screen portion.

The glass touch screen protector 100 can be removed for cleaning and re-application as necessary. For example, the glass touch screen protector 100 can be cleaned by rinsing with water and air drying. Small amounts of dishwashing detergent can be applied if needed. Any debris or dust caught on the touch screen portion can be removed, for example, using a microfiber cloth. Once done rinsing, the glass touch screen protector 100 can be placed, adhesive side up, onto a towel and allowed to air dry. After the glass touch screen protector 100 is dry and clean, it can be reapplied to the portable electronic device.

Figure 5:
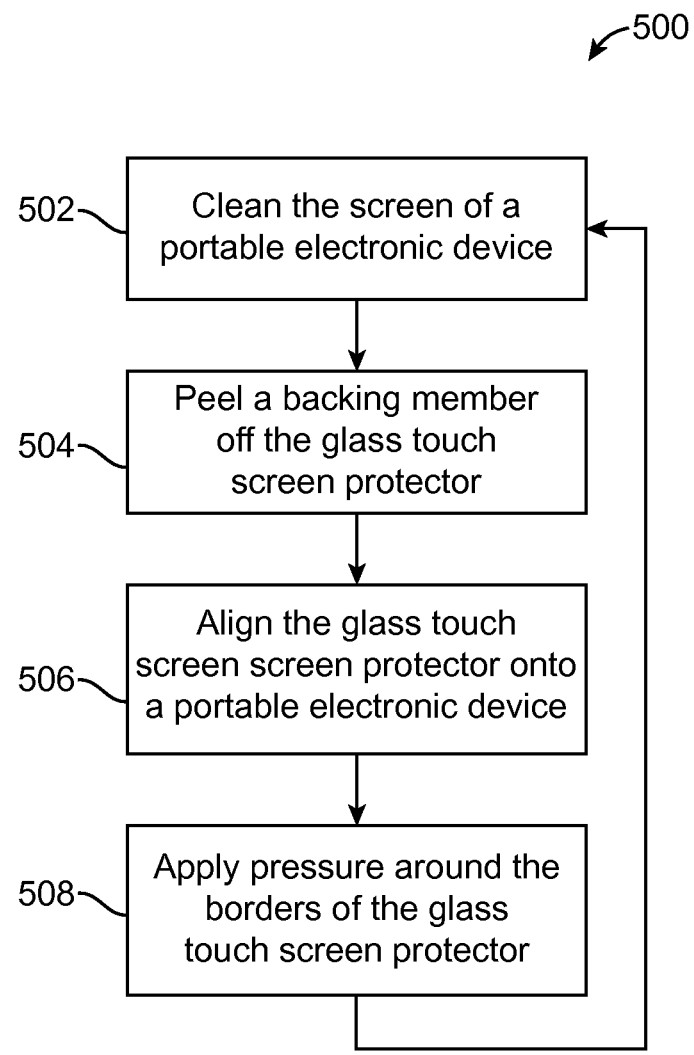
FIG. 5 is a flowchart for applying a glass touch screen protector to a portable electronic device.

Referring to FIG. 5, a method for adhering a glass touch screen protector to a portable electronic device in accordance with an exemplary embodiment is illustrated. The exemplary method 500 is provided by way of example, as there are a variety of ways to carry out the method. The method 500 described below can be carried out using the configurations illustrated in FIGS. 1-4 by way of example, and various elements of these figures are referenced in explaining exemplary method 500. Each block shown in FIG. 5 represents one or more processes, methods or subroutines, carried out in the exemplary method 500. The exemplary method 500 can begin at block 502.

At block 502, the screen of a portable electronic device is cleaned. For example, a user can use a microfiber cloth or other suitable cleaner to wipe away any dust particles on the screen of portable electronic device 402. The microfiber cloth can be included in the original packaging or can be an aftermarket microfiber cloth. After cleaning the screen of the portable electronic device 402, the method can proceed to block 504. At block 504, a backing member is peeled off of the glass touch screen protector. For example, the backing member 302 can be removed to expose the exposed adhesive 208 protected by the backing member 302. After removing the backing member 302, the method 500 can proceed to block 506. At block 506, the glass touch screen protector is aligned onto the portable electronic device. For example, a user can align the bottom of the glass touch screen protector 100 at the bottom including aligning any button holes. After aligning the glass touch screen protector 100 onto the portable electronic device 402, the method 500 can proceed to block 508. At block 508, pressure is applied around the borders of the glass touch screen protector to mount the glass touch screen protector on the portable electronic device. For example, the user can apply pressure on the glass touch screen protector 100, thereby pressing the exposed adhesive 208 against the portable electronic device 402, to mount the glass touch screen protector 100 onto the portable electronic device 402. After the glass touch screen protector 100 is mounted on the portable electronic device, the glass touch screen protector 100 can be removed and the method 500 can be executed again.

The various embodiments described above are provided by way of illustration only and should not be construed to limit the scope of the disclosure. Various modifications and changes can be made to the principles and embodiments described herein without departing from the scope of the disclosure and without departing from the claims which follow.

What is claimed is:

1. A glass touch screen protector for a portable electronic device having a front face that includes a touch screen portion and an outer perimeter, the glass screen protector comprising:
   a glass sheet having front and back sides, an outer band that corresponds to that of the device, and having a transparent window portion that corresponds in size to the touch screen portion, the glass sheet being convexed with respect to the corresponding touch screen portion of the portable electronic device, wherein the front side and the back side of the glass sheet are curved; and a spacer provided along the outer perimeter of the glass sheet substantially continuously surrounding the transparent window portion, having a thickness sufficient to space the glass sheet near but not in contact with the touch screen portion, the spacer comprising an exposed adhesive portion facing the portable device and an adhesive portion in contact with the glass sheet, the exposed adhesive portion having an adhesive strength that is less than an adhesive strength of the adhesive portion in contact with the glass sheet, wherein the exposed adhesive portion enables repeated removal and re-attachment of the glass sheet with the portable device while the spacer remains secured to the glass sheet, wherein the distance between the glass sheet and the touch screen portion allows a capacitive value on the touch screen portion when touched on the glass sheet and the glass sheet is sufficiently convexed to reduce or prevent visible interference patterns during use.

2. The glass touch screen protector of claim 1, wherein the convexed glass sheet forms a peak in a middle area of the transparent window portion.

3. The glass touch screen protector of claim 1, wherein the space between the convexed glass sheet and the touch screen portion increases from the outer perimeter of the convex glass sheet toward a middle area of the convex glass sheet when mounted on the electronic device.

4. A glass touch screen protector of claim 1, wherein the exposed adhesive portion having adhesive strength enables repeated removal and reattachment of the glass sheet without leaving adhesive residue on the device.

5. A glass touch screen protector of claim 1, wherein the glass sheet maintains an initial convex state when pressure is applied against the touch screen portion.

6. The glass touch screen protector of claim 1, wherein the spacer has a thickness between about 0.01 mm to 0.2 mm.

7. The glass touch screen protector of claim 1, wherein the spacer comprises an adhesive having the exposed adhesive portion or multiple layers of adhesives wherein at least one of the multiple layers of adhesives comprises the exposed adhesive portion.

8. The glass touch screen protector of claim 1, wherein the exposed adhesive portion is a silicone adhesive.

9. The glass touch screen protector of claim 1, wherein the spacer comprises a plastic strip and an adhesive.

10. The glass touch screen protector of claim 1, wherein the glass sheet includes an opaque band about its periphery that receives the spacer.

11. The glass touch screen protector of claim 1, wherein micro-particles are present on an under side of the glass sheet at a density which is sufficiently high to provide an anti-static effect without adversely affecting quality of images viewed through the window.

12. The glass touch screen protector of claim 1, wherein the front face of the device has a non-functional band about a perimeter of the device and the spacer width is selected to conform to or be within the band so that the spacer does not interfere with the use of the touch screen portion when the protector is adhesively mounted onto the device.

13. The glass touch screen protector of claim 1, which further comprises one or more alignment holes that substantially correspond to one or more buttons on the device to facilitate mounting of the protector on the device.

14. The glass touch screen protector of claim 1, wherein the touch screen of the device and the glass sheet are each substantially rectangular and the touch screen is part of a telephone, reading device, music device, viewing device or navigation device.

15. The glass touch screen protector of claim 1, further comprising:
a shatterproof layer, disposed on the glass sheet and configured to prevent the glass sheet from fracturing into small pieces when shattered.

16. A glass touch screen protector for a portable electronic device having a front face that includes a touch screen portion and an outer perimeter, the glass screen protector comprising:
a convex glass sheet having front and back sides, an outer perimeter that corresponds to that of the device, and having a transparent window portion that corresponds in size to the touch screen portion, the convex glass sheet being convexed with respect to the corresponding touch screen portion of the portable electronic device, the transparent window portion of the convex glass sheet being spaced near but not in contact with the touch screen portion, wherein the front side and the back side of the convex glass are curved;
an adhesive provided along the outer perimeter of the convex glass sheet substantially continuously surrounding the transparent window portion and having an exposed surface for mounting the protector onto the front face of the electronic device and having an adhesive strength that is less than an adhesive strength between the adhesive and the convex glass sheet, wherein the exposed adhesive portion enables repeated removal and re-attachment of the glass sheet with the portable device while the spacer remains secured to the glass sheet;
wherein the distance between the glass sheet and the touch screen portion allows a capacitive value on the touch screen portion when touched on the glass sheet and the glass sheet is sufficiently convexed to reduce or prevent visible interference patterns during use.

17. The glass touch screen protector of claim 16, the adhesive forming a spacer having a thickness sufficient to space the convex glass sheet near but not in contact with the touch screen portion.

18. The glass touch screen protector of claim 16, wherein the convex glass sheet forms a peak in a middle area of the transparent window portion.

19. The glass touch screen protector of claim 16, wherein the space between the convex glass sheet and the front face of the electronic device increases from the outer perimeter of the convex glass sheet toward a middle area of the convex glass sheet when mounted on the electronic device.

20. The glass touch screen protector of claim 16, wherein micro-particles are present on an under side of the glass sheet at a density which is sufficiently high to provide an anti-static effect without adversely affecting quality of images viewed through the window.

21. The glass touch screen protector of claim 16, wherein the front face of the device has a non-functional band about a perimeter of the device and the spacer width is selected to conform to or be within the band so that the spacer does not interfere with the use of the touch screen portion when the protector is adhesively mounted onto the device.

* * * * *